US008567684B2

(12) United States Patent
Cameron et al.

(10) Patent No.: US 8,567,684 B2
(45) Date of Patent: Oct. 29, 2013

(54) PAYMENT DEVICE PHOTO ALBUM

(75) Inventors: Jennifer R. Cameron, Denver, CO (US); Stacy M. Jensen, Maple Grove, MN (US)

(73) Assignee: First Data Corporation, Greenwood Village, CO (US)

( * ) Notice: Subject to any disclaimer, the term of this patent is extended or adjusted under 35 U.S.C. 154(b) by 217 days.

(21) Appl. No.: 12/693,170

(22) Filed: Jan. 25, 2010

(65) Prior Publication Data

US 2011/0180608 A1 Jul. 28, 2011

(51) Int. Cl.
*G06K 19/06* (2006.01)

(52) U.S. Cl.
USPC .............................. 235/492; 235/375; 235/487

(58) Field of Classification Search
USPC .................. 235/492, 487, 380, 451, 493, 375
See application file for complete search history.

(56) References Cited

U.S. PATENT DOCUMENTS

| | | | | |
|---|---|---|---|---|
| 5,626,551 A * | 5/1997 | Kearns et al. | ................. | 493/231 |
| 6,145,882 A * | 11/2000 | Fu | ................................... | 281/22 |
| 6,299,530 B1 * | 10/2001 | Hansted et al. | ................. | 462/64 |
| 6,824,066 B2 * | 11/2004 | Weyant | ......................... | 235/493 |
| 7,127,841 B1 * | 10/2006 | Weber | ......................... | 40/124.03 |
| 8,033,475 B2 * | 10/2011 | Flynn | ............................. | 235/492 |
| 2002/0040935 A1 * | 4/2002 | Weyant | ........................ | 235/487 |
| 2005/0218212 A1 * | 10/2005 | Berthe | ......................... | 235/380 |
| 2005/0252591 A1 * | 11/2005 | Beckley | ........................ | 150/138 |
| 2006/0005439 A1 * | 1/2006 | Matsumura et al. | ............ | 40/310 |
| 2006/0187055 A1 * | 8/2006 | Colby | .......................... | 340/572.7 |
| 2007/0200000 A1 * | 8/2007 | Sanders | ........................ | 235/487 |
| 2007/0200334 A1 * | 8/2007 | Thomsen | ..................... | 281/15.1 |
| 2008/0073896 A1 * | 3/2008 | Colby et al. | ................. | 281/15.1 |
| 2008/0223925 A1 * | 9/2008 | Saito et al. | .................... | 235/380 |
| 2009/0091118 A1 * | 4/2009 | Marshall | .......................... | 281/29 |
| 2009/0121470 A1 * | 5/2009 | Exline et al. | ................... | 281/31 |
| 2010/0133128 A1 * | 6/2010 | Preece | .......................... | 206/232 |
| 2011/0109457 A1 * | 5/2011 | Maharshak et al. | ....... | 340/568.7 |

* cited by examiner

*Primary Examiner* — Edwyn Labaze
(74) *Attorney, Agent, or Firm* — Sutherland Asbill & Brennan LLP

(57) ABSTRACT

Payment devices and methods for forming payment devices are provided. A payment device may include a front cover, a back cover, and at least one insert, and at least one payment mechanism. The at least one insert may be disposed or situated between the front cover and the back cover, and the front cover, back cover, and the at least one insert may be hinged together along a respective common edge. The at least one payment mechanism may be integrated into one or more of the front cover, the back cover, or the at least one insert.

17 Claims, 6 Drawing Sheets

PAYMENT DEVICE PHOTO ALBUM

FIELD OF THE INVENTION

Embodiments of the invention relate generally to payment devices, and more particularly, to payment devices that include a photo album.

BACKGROUND OF THE INVENTION

Payment cards, such as credit cards, debit cards, ATM cards, bank cards, etc., are increasingly replacing other types of tender in consumer transactions. In addition, vendors and merchants are issuing different types of payment cards, such as loyalty cards, gift cards, stored value cards, etc., for sales promotions and the cultivation of customer loyalty. Many payment cards, such as gift cards, are plastic magnetic stripe cards that include information that has been pre-printed on the card. However, existing gift cards and other payment cards do not easily permit a giver to present a personalized message to a recipient.

Accordingly, a need exists for gift cards and other payment devices that may be personalized. Additionally, a need exists for payment devices that include a photo album.

BRIEF DESCRIPTION OF THE INVENTION

Some or all of the above needs and/or problems may be addressed by certain embodiments of the invention. Embodiments of the invention may include payment devices and methods for manufacturing payment devices. In one embodiment, a payment device may be provided. The payment device may include a front cover, a back cover, and at least one insert, and at least one payment mechanism. The at least one insert may be disposed or situated between the front cover and the back cover, and the front cover, back cover, and the at least one insert may be hinged together along a respective common edge. The at least one payment mechanism may be integrated into one or more of the front cover, the back cover, or the at least one insert.

In accordance with another embodiment of the invention, a method for forming a payment device may be provided. A front cover, a back cover, and at least one insert may be provided. At least one payment mechanism may be integrated into one or more of the front cover, the back cover, or the at least one insert. The front cover, the back cover, and the at least one insert may be hinged together along a respective common edge. In this regard, a booklet or album may be formed in certain embodiments of the invention.

According to yet another embodiment of the invention, a payment device may be provided. The payment device may include a booklet that includes a front cover, a back cover, and one or more inserts disposed between the front cover and the back cover. The payment device may further include at least one payment mechanism integrated into the booklet.

Additional apparatus, methods, systems, features, and aspects are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE DRAWINGS

Figure 1:
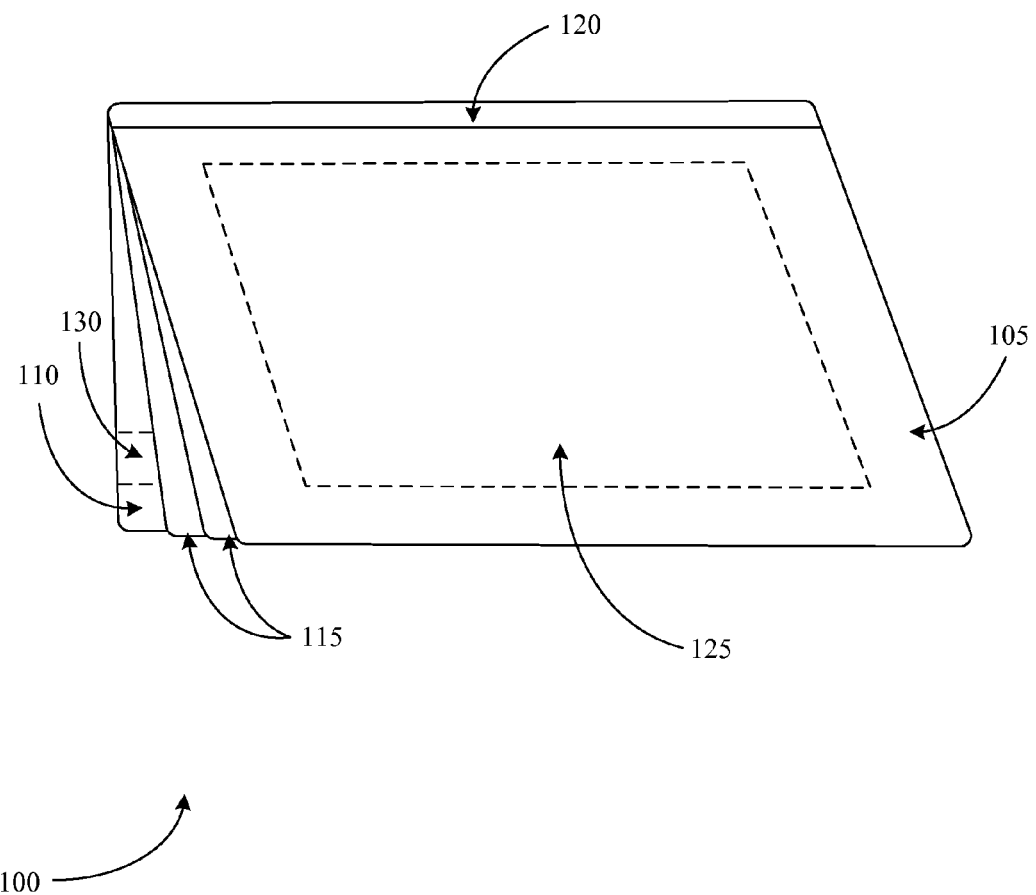

Having thus described the invention in general terms, reference will now be made to the accompanying drawings, which are not necessarily drawn to scale, and wherein:

FIG. 1 is a perspective view of one example payment device, according to an illustrative embodiment of the invention.

Figure 2A:
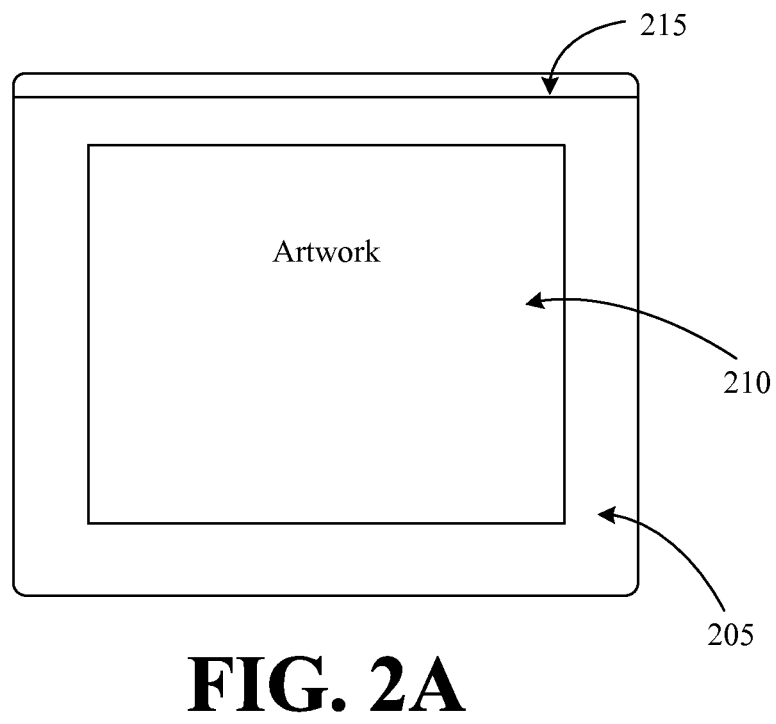
Figure 2B:
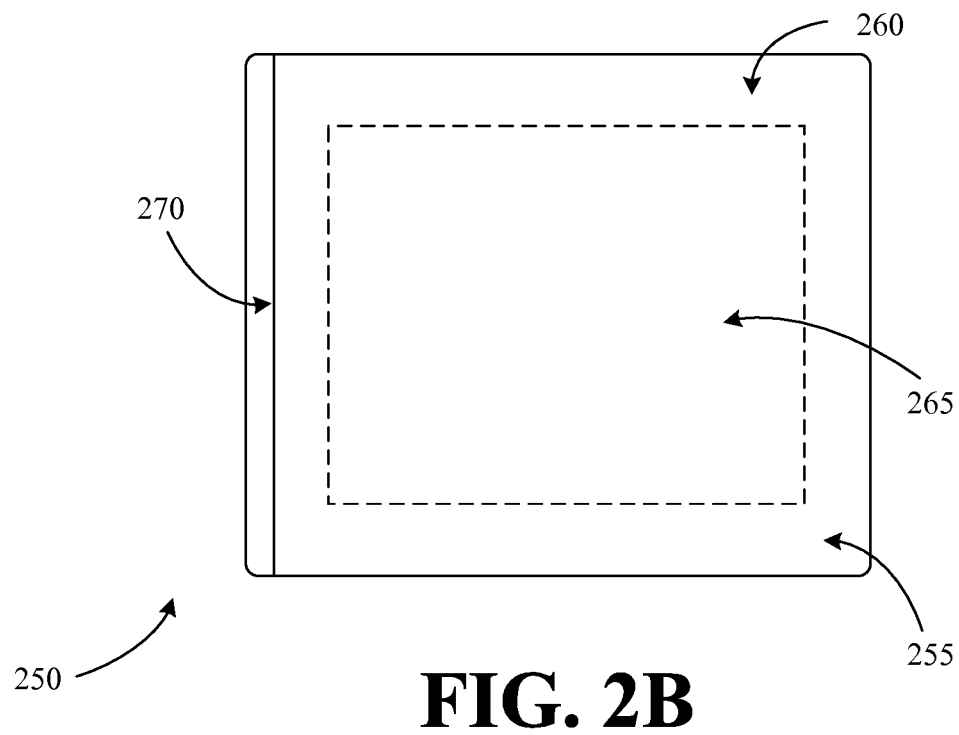

FIGS. 2A and 2B are block views of example front covers that may be utilized in accordance with various embodiments of the invention.

Figure 3A:
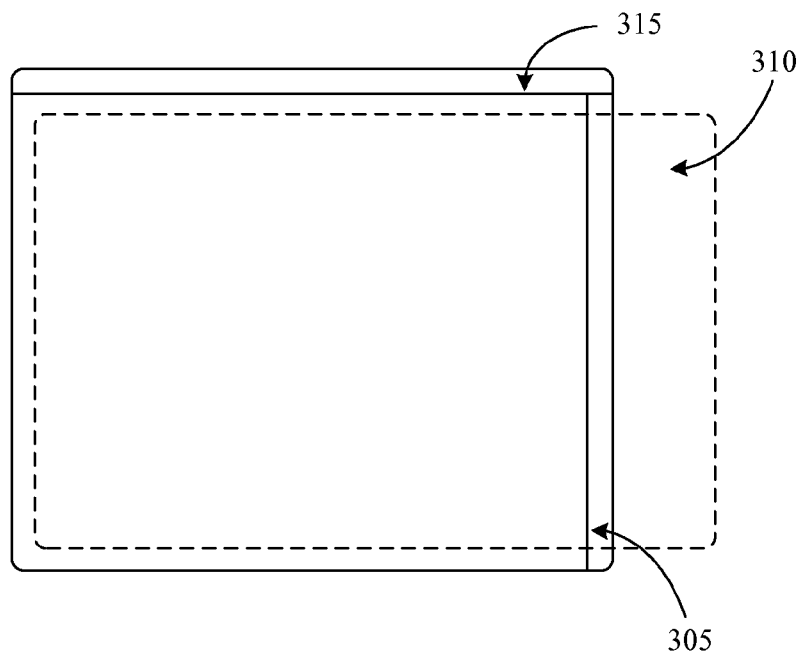
Figure 3B:
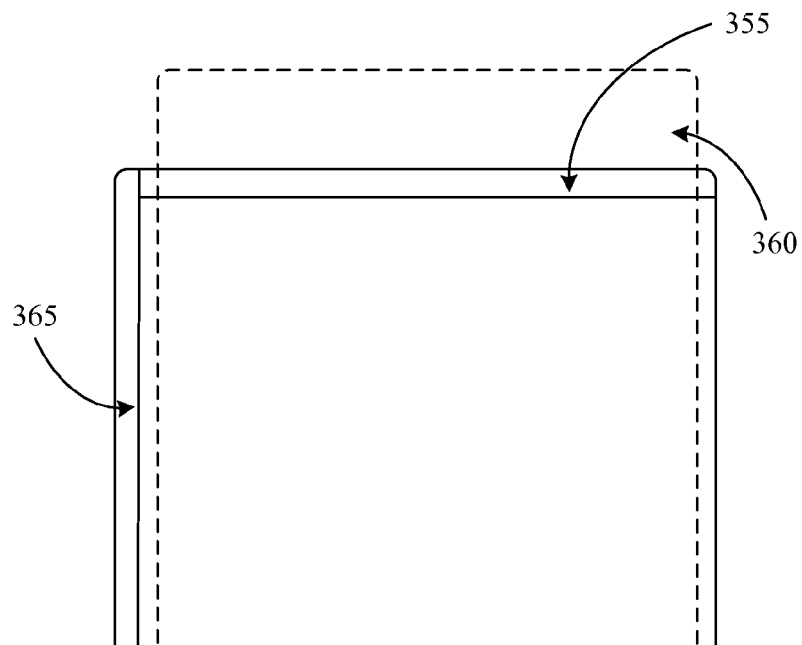

FIGS. 3A and 3B are block views of example inserts that may be utilized in accordance with various embodiments of the invention.

Figure 4A:
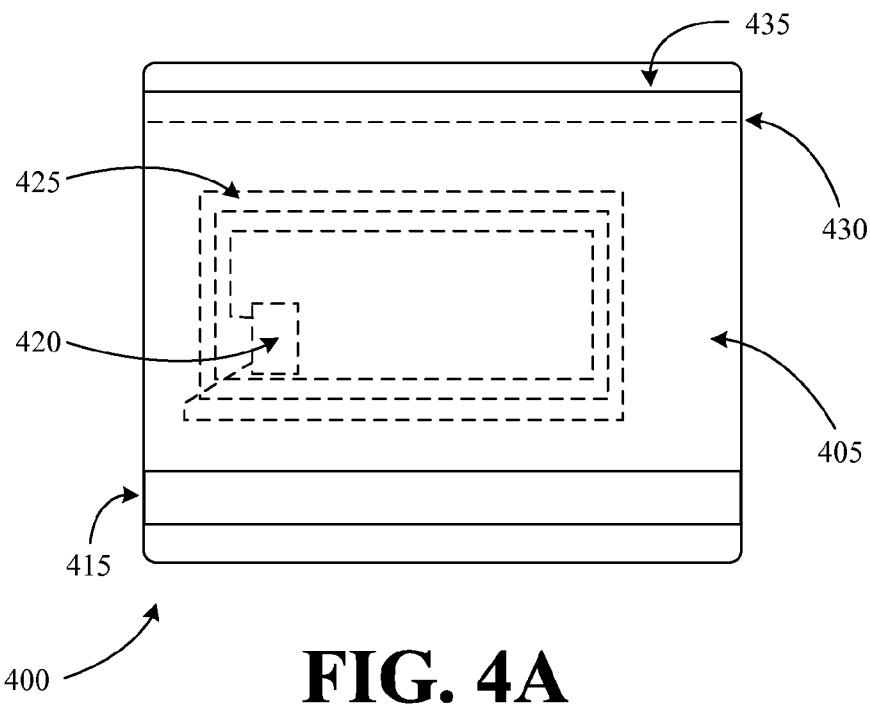
Figure 4B:
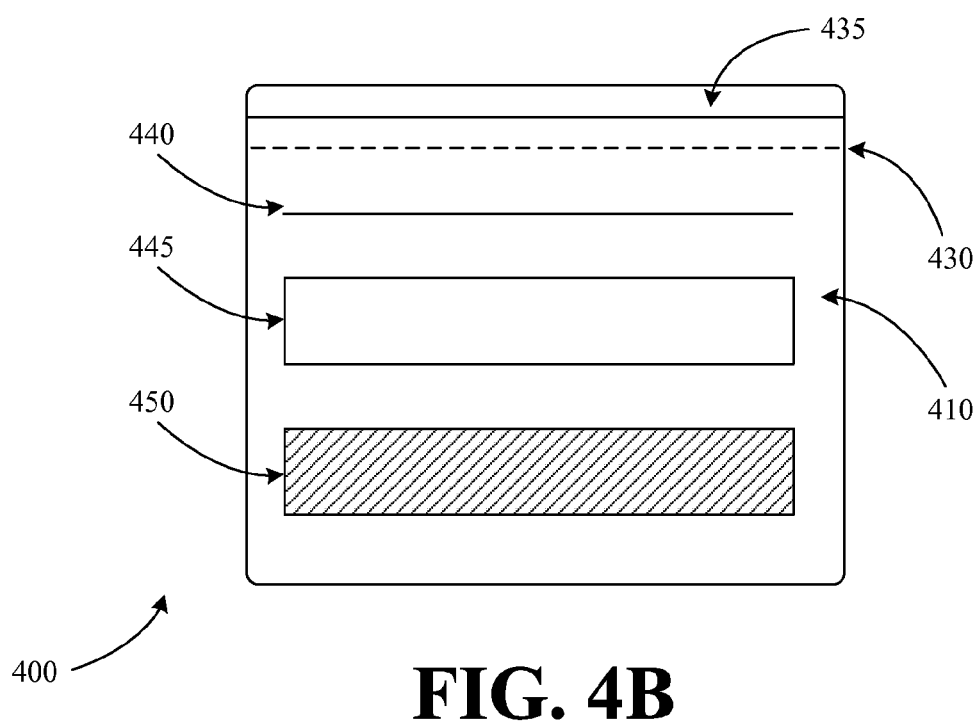

FIGS. 4A and 4B are front and back views of an example back cover that may be utilized in accordance with various embodiments of the invention.

Figure 5A:
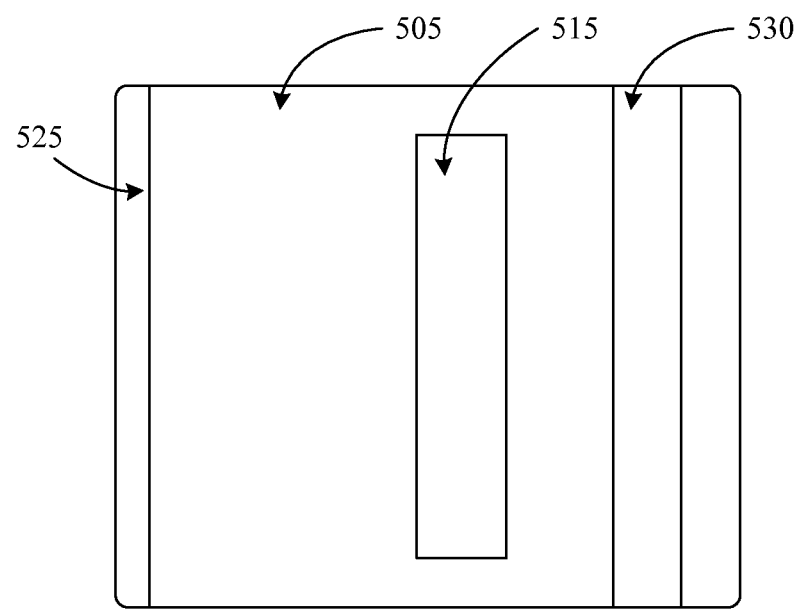
Figure 5B:
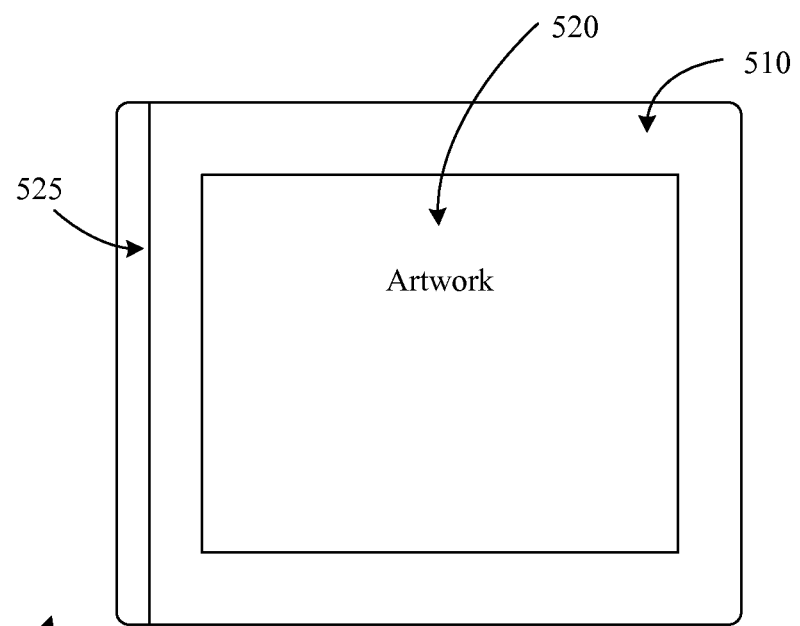

FIGS. 5A and 5B are front and back views of another example back cover that may be utilized in accordance with various embodiments of the invention.

Figure 6:
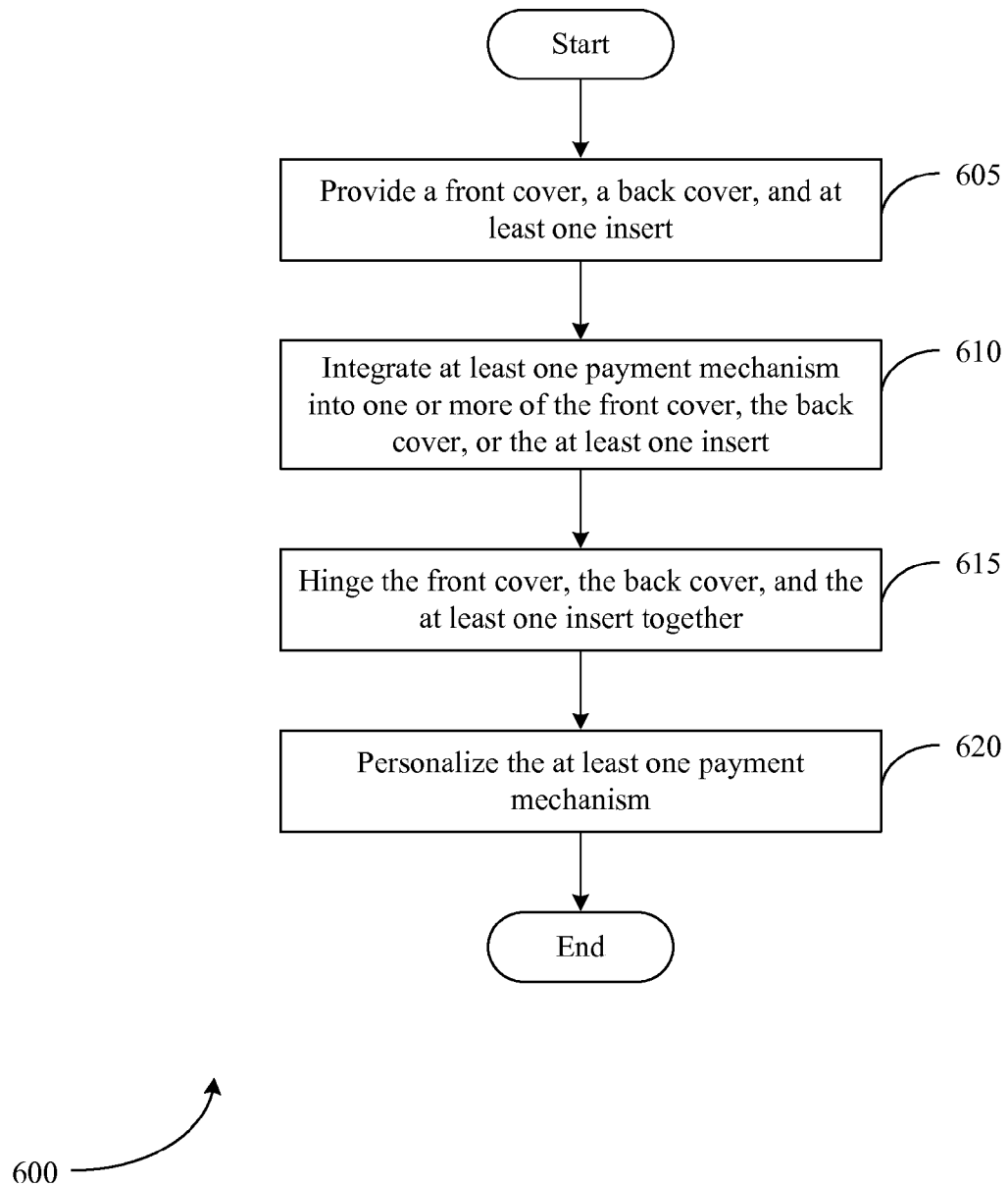

FIG. 6 is a flowchart of an example method for forming a payment device, according to an illustrative embodiment of the invention.

DETAILED DESCRIPTION OF EMBODIMENTS OF THE INVENTION

Example embodiments of the invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the term "payment mechanism" may refer to any suitable or appropriate mechanism or device that may be utilized by a consumer to facilitate a transaction at a merchant point of sale. In certain embodiments, a payment mechanism may be associated with one or more accounts utilized by a consumer to facilitate a transaction. Examples of payment mechanisms include, but are not limited to, magnetic stripes or magnetic strips that are encoded with payment and/or account information, contactless chips, other contactless payment mechanisms, etc. Contactless payment mechanisms may be operable to conduct an electronic transaction using a wireless communication protocol. An example contactless payment mechanism may be, but is not limited to, a radio frequency identification device (RFID) including an integrated circuit chip connected to an antenna or wireless transmitter and/or receiver. An example contactless payment mechanism may use any number of suitable wireless communication protocols, such as RFID, Bluetooth, infrared, and the like. Example payment transactions that may be completed utilizing a payment mechanism include commercial transactions at a merchant point of sale terminal, such as credit card, debit card, gift card, stored value card, and/or loyalty transactions.

As used herein, the term "hinged" may refer to a suitable or appropriate attachment or connection that may be formed between components of a payment device. An area in which a hinged attachment is formed may be referred to as an "attachment area." A hinged attachment may facilitate the opening and/or closing of a payment device such that components of the payment device may be at least partially rotated about the attachment area. For example, a front cover, back cover, and/or insert of a payment device may be hinged together such that each component may be at least partially rotated about the hinged attachment area. In certain embodiments, a hinged attachment may be formed along at least one respective common edge of each of the components. For example, each of the components of a rectangularly-shaped payment device may be hinged together along a top edge or along a side edge. As another example, each of the components of an octagonally-shaped payment device may be hinged together along one or more common edges. A wide variety of suitable attachment devices and/or attachment techniques may be utilized as desired to form a hinge or hinged attachment, including but not limited to, staples, binding, adhesives, radio frequency (RF) sealing, hypersonic sealing, ultrasonic sealing, etc.

In accordance with example embodiments of the invention, payment devices and methods for forming payment devices are provided. A payment device may include a front cover, a back cover, and at least one insert or insert sheet disposed between the front cover and the back cover. The front cover, back cover, and insert sheet(s) may be hinged together along a respective common edge. In this regard, the payment device may form a booklet, album, etc. In certain embodiments, one or more insert sheets contained within the booklet may include photo sleeves, such that a photo album is formed. Additionally, in accordance with an aspect of the invention, at least one payment mechanism may be integrated into or incorporated into one or more of the front cover, the back cover, or the at least one insert. A wide variety of payment mechanisms may be utilized as desired in various embodiments, such as a magnetic stripe payment mechanism or a contactless payment mechanism.

Certain embodiments of the invention may be utilized as gift card payment devices or stored value card payment devices. For example, a consumer may purchase a gift card payment device for personal use or as a gift. The consumer may personalize the payment device by adding messages, artwork, and/or graphics to the payment device. Additionally, in certain embodiments, the consumer may insert one or more photos into photo sleeves of the payment device. In this regard, a gift card photo album may be formed.

FIG. 1 is a perspective view of one example payment device 100, according to an illustrative embodiment of the invention. The payment device 100 may include a front cover 105, a back cover 110, and one or more insert sheets 115 disposed between the front cover 105 and the back cover 110. The front cover 105, back cover 110, and insert 115 may be hinged together by one or more suitable attachment devices and/or attachment techniques, as set forth in greater detail below. As shown in FIG. 1, an attachment area 120 or a seal area may be formed by hinging or hingedly attaching the front cover 105, back cover 110, and inserts 115. In this regard, a booklet may be created.

The front cover 105 may form a front of the payment device 100, and the front cover 105 may be positioned at a closed position, an opened position, or any intermediate position by being rotated about or pivoted about the attachment area 120. The front cover 105 may include a first side and a second side. The first side or front side of the front cover 105 may face away from the other components of the payment device 100 when the front cover 105 is in a closed position, and the second side or back side of the front cover 105 may face towards an insert sheet 115 of the payment device 100 when the front cover 105 is in a closed position.

As desired in certain embodiments, a wide variety of graphics, designs, artwork, illustrations, alphanumeric text, etc. may be printed, stamped, painted, etched, embossed, or otherwise formed on the front cover 105. For example, a merchant identification may be formed on the front cover 105. As another example, a holiday illustration, holiday graphic, and/or holiday greeting or message for a special occasion or event (e.g., Happy Holidays, Merry Christmas, Happy Birthday, Happy Anniversary, Congratulations, etc.) may be formed on the front cover 105. As desired, the front cover 105 may be printed on the front side, the back side, and/or on both sides. In certain embodiments, the materials from which the front cover 105 is constructed as well as available printing devices and/or techniques may limit printing to a single side.

In certain embodiments, graphics, other illustrations, and/or text may be formed on the front cover 105 during the initial manufacture of the front cover 105 and/or the payment device 100. For example, a merchant may purchase or order front covers and/or payment devices with designated graphics and/or messages, and the graphics and/or messages may be printed on the payment devices during manufacture. In other embodiments, at least a portion of the graphics, illustrations, and/or text may be printed on the front cover 105 during a personalization process when the payment device 100 is purchased by a consumer. For example, a consumer at a merchant location may purchase a payment device 100 and a printer or other personalization device, such as a suitable printer incorporated into a dispensing machine from which the payment device is purchased, may be utilized to print a personalized message and/or consumer specified or selected graphics onto the front cover 105. In other embodiments, at least a portion of the front cover 105 may be formed from one or more suitable materials that permit a consumer to write, draw, and/or print a personalized message and/or graphics onto the front cover 105. For example, at least a portion of the front cover 105 may be formed of a cardboard or paper material on which a consumer can print a message.

Additionally, in certain embodiments, the front cover 105 may include one or more windows 125. In certain embodiments, a window 125 may be formed as an opening in the front cover 105. In other embodiments, a window 125 may be formed from a suitable transparent, semi-transparent, or translucent material, such as clear vinyl material. The window 125 may permit a first insert sheet 115 of the payment device 100 to be at least partially visible. For example, if a first insert sheet 115 is a photo sleeve, then one or more photos inserted into the photo sleeve may be visible. As another example, if the first insert sheet 115 includes a printed message, then at least a portion of the printed message may be visible through the window 125.

The front cover 105 may be formed from a wide variety of suitable materials, including but not limited to, a vinyl material, a flexible vinyl material, a polyvinyl material, a cardboard material, a paper material, a combination of suitable materials, etc. In one example embodiment, the front cover 105 may be formed from flexible vinyl having a thickness of approximately 0.010 inches. A few example front covers are described in greater detail below with reference to FIGS. 2A and 2B.

The back cover 110 may form a back of the payment device 100, and the back cover 110 may be positioned at a closed positioned, an opened position, or any intermediate position by being rotated about or pivoted about the attachment area 120. The back cover 110 may include a first side and a second side. The first side or front side of the back cover 110 may face towards one or more of the other components of the payment device 100 when the back cover 110 is in a closed position, and the second side or back side of the back cover 110 may face away from the other components of the payment device 100 when the back cover 110 is in a closed position.

As desired in certain embodiments, a wide variety of graphics, designs, artwork, illustrations, alphanumeric text, etc. may be printed, stamped, painted, etched, embossed, or otherwise formed on the back cover 110. For example, graphics and/or text may be formed on the back cover 110 in a similar manner as that described above for the front cover 105. Additionally, as desired in certain embodiments, the back cover 110 may include one or more windows that are similar to those described above for the front cover. Indeed, as desired in various embodiments, features described for the front cover 105 and the back cover 110 may be interchangeable.

In certain embodiments, the back cover 110 may include or be formed from a suitable transaction card, such as a gift card. For example, the back cover 110 may include a standard magnetic stripe transaction card and/or a contactless transaction card. As such, the back cover 110 may include one or more of a magnetic stripe or magnetic strip, a contactless payment mechanism (e.g., an RFID chip and/or antenna), a signature area, legal information, terms and conditions, a scratch off area that includes gift card personal identification number (PIN) information, etc. Additionally, as desired, at least a portion of the transaction card, such as a portion that includes a magnetic stripe 130 may be detachable from the back cover 110.

The back cover 110 may be formed from a wide variety of suitable materials, including but not limited to, a vinyl material, a flexible vinyl material, a polyvinyl material, a cardboard material, a paper material, a combination of suitable materials, etc. For example, in embodiments in which the back cover 110 is formed of or includes a gift card, the back cover 110 may be formed from a polyvinyl chloride (PVC) transaction card. In this regard, a gift card or other transaction card may be incorporated into a booklet or photo album. A few example back covers are described in greater detail below with reference to FIGS. 4A-5B.

The inserts 115 or insert sheets may be suitable sheets and/or inserts that include, for example, additional graphics, images, pictures, and/or text. The inserts 115 may be disposed and/or hingedly attached between the front cover 105 and the back cover 110. Any number of inserts 115 may be included as desired in various embodiments of the invention. For example, two inserts, three inserts, or any other number of inserts may be included.

A wide variety of different types of inserts 115 may be utilized as desired in various embodiments of the invention. A first type of insert may be an insert on which graphics, illustrations, and/or text are printed. For example, a story, poem, special offers, advertisements, etc. may be printed on one or more inserts 115. Graphics, text, and/or other material may be printed or otherwise disposed on an insert 115 in a similar manner as that described above with reference to the front cover 105. In this regard, a gift card that includes a story, advertisements, etc. may be formed. A second type of insert may be an insert that is formed as or that includes one or more photo sleeves in which pictures may be inserted. For example, an insert 115 may include one or more vinyl photo sleeves or other suitable photo sleeves. In this regard, a gift card that includes a photo album or that is a photo album may be formed. As desired, multiple types of inserts may be included in a payment device 100. For example, one or more photo sleeve inserts and one or more inserts that include printed material may be included.

The inserts 115 may be formed from a wide variety of suitable materials, including but not limited to, a vinyl material, a flexible vinyl material, a polyvinyl material, a cardboard material, a paper material, a combination of suitable materials, etc. For example, in embodiments, vinyl photo sleeves may be utilized as inserts. As another example, vinyl or cardboard inserts may be provided on which graphics and/or text are pre-printed and/or may be printed by a consumer. In an example embodiment of the invention, two to four photo sleeve insert sheets may be included in a payment device 100. A few example inserts are described in greater detail below with reference to FIGS. 3A and 3B.

The attachment area 120 may be an area in which the components of the payment device 100 (e.g., the front cover 105, the back cover 110, and the inserts 115) are hinged or hingedly attached to one another. In certain embodiments, the attachment area 120 may be formed along a common edge of the payment device 100 components. For example, the attachment area 120 may be formed along a common horizontal edge or a common vertical edge of the payment device 100 components. In this regard, a booklet that opens in a vertical direction or a horizontal direction may be formed. For example, an attachment area 120 may be formed along a top edge of the components to form a booklet or album that opens in a vertical manner. An another example, an attachment area 120 may be formed along a side edge (e.g., left edge or right edge) of the components to form a booklet or album that opens in a horizontal manner. The attachment area 120 may include a wide variety of different dimensions as desired in various embodiments of the invention. For example, the attachment area 120 may have a height of approximately one eighth of an inch along a common edge of the components of the payment device 100.

A wide variety of attachment mechanisms and/or attachment techniques may be utilized to hinge or hingedly attach the front cover 105, back cover 110, and inserts 115 to one another. Suitable attachment mechanisms may include, but are not limited to, a binding (e.g., a spiral binding), staples, rivets, etc. Suitable attachment techniques include an adhesive sealing technique, a radio frequency sealing technique, a hypersonic sealing technique, an ultrasonic sealing technique, etc. If an adhesive is utilized, a wide variety of different types of adhesives may be utilized.

In certain embodiments of the invention, one or more components of the payment device 100 may be formed from similar materials to facilitate the attachment or hinging of the components. As desired, the front cover 105, back cover 110, and/or insert sheets 115 may be formed from similar materials that facilitate certain attachment or hinging techniques. In one example embodiment, the components of the payment device 100 may be formed from vinyl and/or polyvinyl chloride, and the components of the payment device 100 may be attached utilizing a radio frequency, hypersonic, or ultrasonic sealing technique.

According to an aspect of the invention, one or more suitable payment mechanisms may be integrated into and/or incorporated into the payment device 100. The payment mechanisms may be integrated into the front cover 105, back cover 110, and/or into one or more inserts 115 of the payment device 100 as desired in various embodiments of the invention. For example, in embodiments in which the back cover 110 includes a transaction card, the payment mechanisms may be integrated into the back cover 110. A wide variety of different types of payment mechanisms may be integrated into the payment device 100 as desired, for example, a magnetic stripe 130 payment mechanism, a bar code payment device, and/or a suitable contactless payment mechanism, such as a contactless payment mechanism that includes an integrated circuit (IC) chip coupled to an appropriate antenna and/or transceiver. The payment mechanisms may facilitate communication between the payment device 100 and a point of sale (POS) terminal/device, such as a POS device situated at a merchant location. For example, a magnetic stripe or barcode may be read by a suitable magnetic stripe reader or barcode reader associated with the POS device. As another example, a contactless payment mechanism may communicate with an RFID transceiver, other RFID communication devices, Bluetooth transceivers and/or other Bluetooth communication devices, and/or near field communication (NFC) devices associated with the POS device utilizing one or more suitable communications protocols. In this regard, the payment device 100 may be utilized to facilitate a transaction at a merchant location.

In certain embodiments of the invention, an audio device and/or audio circuit may be integrated into and/or incorporated into the payment device 100. The audio device may include at least one memory that is operable to store an audio message and/or at least one suitable speaker that facilitates the output of an audio message by the payment device 100, such as a holiday greeting or other message. In certain embodiments, the audio device may include a microphone that facilitates the receipt of one or more personalized messages for storage in the at least one memory such that the messages may be output by the at least one speaker. In this regard, a purchaser of a gift card may record one or more personalized messages that may subsequently be output to a recipient of the gift card.

Payment devices in accordance with various embodiments of the invention, such as the payment device 100 shown in FIG. 1, may be formed utilizing a wide variety of different dimensions and/or measurements. As one example, the dimensions of a payment device 100 may be approximately equal to or slightly larger than the dimensions of a wallet sized picture. For example, one or more photo sleeves included in the payment device 100 may be sized to receive wallet sized photos, and the front cover 105 and back cover 110 of the payment device 100 may be similarly sized. As one example, the dimensions of the payment device 100 may be between approximately two and a half (2.5) by three and a half (3.5) inches and approximately two and three quarters (2.75) by three and three quarters (3.75) inches. In this regard, the payment device 100 may be stored in a wallet. Although the payment device 100 of FIG. 1 is described as an approximately wallet sized device, other dimensions may be utilized for a payment device 100 as desired in various embodiments of the invention.

Additionally, payment devices in accordance with various embodiments of the invention may be formed in a wide variety of different shapes and/or configurations. For example, payment devices may be formed having a substantially rectangular shape, a substantially triangular shape, a substantially hexagonal shape, a substantially octagonal shape, etc. Although the example payment devices illustrated herein have a substantially rectangular shape, these example payment devices are provided by way of example only and should not be construed as limiting. Additionally, the attachment area that is formed for the components of a payment device may differ for differing shapes that are utilized to form the payment device. For example, the components of a substantially rectangular payment device may be hinged together along a respective common edge while the components of a substantially octagonal payment device may be hinged together along one or two respective common edges.

Additionally, in certain embodiments of the invention, a temporary or removable attachment may be formed between one or more of the components of a payment device. The temporary attachment may be in addition to the hinged attachment that is formed between the components. For example, the payment device 100 may include a temporary attachment between the front cover 105 and the back cover 110 (and optionally one or more inserts 115) that facilitates maintaining the payment device 100 in a closed position. Maintaining the payment device 100 in a closed position may facilitate shipping and/or distribution of the payment device, as well as display of the payment device 100 at a merchant location. The temporary attachment may be formed at one or more points between components of the payment device 100, for example, at a point on or along an edge of the components that is opposite to an edge at which the components are hinged together. For example, if the components of a payment device 100 are hinged together along a top edge, then a temporary attachment may be performed at one or more points on or along a bottom edge of the components. As desired, a temporary attachment may also be formed along other edges of the components, such as one or more of the side edges. Indeed, temporary attachments may be formed at any point or along any edge other than an edge in which a hinged attachment is formed. A wide variety of temporary attachments and/or temporary attachment techniques may be utilized as desired in various embodiments of the invention, for example, removable adhesive, snaps, removable staples, one or more removable or breakable scored edges, etc. A temporary attachment may be severed, removed, and/or opened by a customer or other user of the payment device 100 in order to facilitate opening of the payment device 100.

FIGS. 2A and 2B are block views of example front covers 200, 250 that may be utilized in accordance with various embodiments of the invention. The example front covers 200, 250 illustrated in FIGS. 2A and 2B are example front covers that may be incorporated into a suitable payment device, such as the payment device 100 illustrated in FIG. 1. With reference to FIG. 2A, a first example front cover 200 is illustrated. A first side or front side 205 of the front cover 200 is illustrated. The front side 205 of the front cover 200 may include a wide variety of different types of artwork 210, graphics, text, and/or illustrations as desired in various embodiments of the invention. For example, a holiday or special occasion illustration and/or message may be printed or otherwise disposed on the front side 205 of the front cover 200. As desired, a merchant identifier and/or identifier for an issuer of a payment device 100 may additionally or alternatively be printed or otherwise disposed on the front side 205 of the front cover 200.

The front cover 200 may include an attachment area 215 or a seal area that is designated or formed in a horizontal manner. For example, the attachment area 215 may be formed along a horizontal edge of the front cover 200, such as a top edge of the front cover 200. In this regard, the front cover 200 may be opened in a vertical manner. In other embodiments, the attachment area 215 may be formed along a vertical edge of the front cover 200, as illustrated for the second example front cover 250 of FIG. 2B. A hinged attachment of the front cover 200 to other components of the payment device 100 may be formed utilizing a wide variety of different attachment mechanisms and/or techniques, as discussed in greater detail above with reference to FIG. 1. In certain embodiments, any artwork 210 printed or otherwise disposed on the front cover 200 may not be printed or otherwise disposed within the attachment area 215.

With reference to FIG. 2B, a second example front cover 250 is illustrated. A first side or front side 255 of the front cover 250 is illustrated. The front side 255 of the front cover 250 may include a wide variety of different types of artwork 260, graphics, text, and/or illustrations as desired in various embodiments of the invention. In certain embodiments, the front side 255 of the front cover 250 may include a window 265, such as an opening or a transparent material. In embodiments that include a window 265, any artwork 260 that is included on the front cover 250 may border the window 265.

For example, a graphic or illustration of a picture frame or border may be included on the front side 255 of the front cover 250. As desired, a merchant identifier and/or identifier for an issuer of a payment device 100 may additionally or alternatively be printed or otherwise disposed on the front side 255 of the front cover 250.

The front cover 250 may include an attachment area 270 or a seal area that is designated or formed in a vertical manner. For example, the attachment area 270 may be formed along a vertical edge of the front cover 250, such as a left edge of the front cover 250. In this regard, the front cover 250 may be opened in a horizontal manner. In other embodiments, the attachment area 270 may be formed along a vertical edge of the front cover 250, as described above for the first example front cover 200 of FIG. 2A. A hinged attachment of the front cover 250 to other components of the payment device 100 may be formed utilizing a wide variety of different attachment mechanisms and/or techniques, as discussed in greater detail above with reference to FIG. 1. In certain embodiments, any artwork 260 printed or otherwise disposed on the front cover 250 may not be printed or otherwise disposed within the attachment area 270.

The front covers 200, 250 may be formed from a wide variety of suitable materials and/or combinations of materials as desired in various embodiments of the invention. For example, the front covers 200, 250 may be formed from a vinyl material, polyvinyl material, polyvinyl chloride (PVC), cardboard, paper, a combination of any of these materials, etc. In certain embodiments, a front cover 200, 250 may be formed from a flexible vinyl material having a thickness of approximately 0.010 inches. Additionally, the front covers 200, 250 may be formed from any number of layers of material as desired in various embodiments of the invention. For example, in certain embodiments, a front cover 200, 250 may be formed from a single or unitary layer of material, such as a single vinyl layer. In other embodiments, a front cover 200, 250 may be formed from a plurality of layers of material. For example, a first layer of material that can be printed upon and a second layer of transparent material that forms a window may be utilized to form a front cover 200, 250. As yet another example, a layer of transparent material may be disposed between two layers of one or more other materials (e.g., vinyl or cardboard layers) in order to form a front cover 200, 250.

Although the second sides or back sides of the front covers 200, 250 are not illustrated in FIGS. 2A and 2B, the second sides or back sides may have a similar structure and/or composition as the front sides 205, 255. For example, the front covers 200, 250 may be formed from a single layer of material and the back side of the front covers 200, 250 may be identical to the front sides 205, 255. As another example, the front covers 200, 250 may be formed from a plurality of layers of material. When a plurality of materials are utilized, the back sides of the front covers 200, 250 may be formed from similar materials or different materials than the front sides 205, 255. In certain embodiments, utilizing multiple layers of a similar material (e.g., a vinyl material) to form a front cover 200, 250 may facilitate bonding or hinged attachment of the various layers of the front cover 200, 250.

A wide variety of different configurations may be utilized to form a front cover of a payment device 100 as desired in various embodiments of the invention. For example, a front cover may include a structure that is similar to the example back covers that are described below with reference to FIGS. 4A-5B. The front covers 200, 250 illustrated in FIGS. 2A and 2B are provided by way of example only and should not be construed as limiting.

FIGS. 3A and 3B are block views of example inserts 300, 350 or insert sheets that may be utilized in accordance with various embodiments of the invention. The example inserts 300, 350 illustrated in FIGS. 3A and 3B are example inserts that may be incorporated into a suitable payment device, such as the payment device 100 illustrated in FIG. 1. With reference to FIG. 3A, a first example insert 300 is illustrated. The insert 300 may be a suitable photo sleeve that is configured to receive one or more photos, such as one or more wallet sized photos. The insert 300 may be formed from one or more layers of material that form a suitable photo sleeve. For example, a single layer of material (e.g., vinyl, etc.) may be folded over and the two halves of the layer may be bonded together to form a photo sleeve. One side of the photo sleeve may be formed by the fold, two sides of the photo sleeve may be attached or bonded together, and a fourth side of the photo sleeve may remain opened. As another example, two layers of material may be bonded together on three sides or along three edges to form a photo sleeve.

As shown the insert 300 may include an opening 305 or slit through which one or more photos 310 or other items may be inserted into the insert 300. Any number of photos 310 may be inserted or placed into the insert 300 as desired in various embodiments. For example, two photos may be inserted in a back-to-back manner such that a first photo is visible through a first side or first face of the insert 300 and a second photo is visible through a second side or second face of the insert 300. In certain embodiments, the opening 305 may be formed along a common edge or common side of the insert 300. As shown, the opening 305 may be formed in a vertical manner along a side (e.g., a right side or left side) of the insert 300; however, the opening 305 may be formed along other sides of the insert 300 as desired in various embodiments of the invention.

The insert 300 illustrated in FIG. 3A may include an attachment area 315 or a seal area that is designated or formed in a horizontal manner. For example, the attachment area 315 may be formed along a horizontal edge of the insert 300, such as a top edge of the insert 300. In this regard, the insert 300 may be disposed within a booklet and rotated or flipped in a vertical manner. In other embodiments, the attachment area 315 may be formed along a vertical edge of the insert 300, as illustrated for the second example insert 350 of FIG. 3B. A hinged attachment of the insert 300 to other components of the payment device 100 may be formed utilizing a wide variety of different attachment mechanisms and/or techniques, as discussed in greater detail above with reference to FIG. 1.

FIG. 3B illustrates a second example insert 350. Similar to the first example insert 300, the second example insert 350 may be a suitable photo sleeve that is configured to receive one or more photos, such as one or more wallet sized photos. The insert 350 may include an opening 355 or slit through which one or more photos 360 or other items may be inserted or placed into the insert 350. Any number of photos 360 may be inserted into the insert 350 as desired in various embodiments, as discussed above with reference to the first example insert 300. In certain embodiments, the opening 355 may be formed along a common edge or common side of the insert 350. As shown, the opening 355 may be formed in a horizontal manner along a side (e.g., a top side) of the insert 350; however, the opening 355 may be formed along other sides of the insert 350 as desired in various embodiments of the invention.

The insert 350 illustrated in FIG. 3B may include an attachment area 365 or a seal area that is designated or formed in a vertical manner. For example, the attachment area 365 may be formed along a vertical edge of the insert 350, such as along a side edge (e.g., a left edge or right edge) of the insert 350. In this regard, the insert 350 may be disposed within a booklet and rotated or flipped in a horizontal manner. In other embodiments, the attachment area 365 may be formed along a horizontal edge of the insert 350, as illustrated for the first example insert 300 of FIG. 3A. A hinged attachment of the insert 350 to other components of the payment device 100 may be formed utilizing a wide variety of different attachment mechanisms and/or techniques, as discussed in greater detail above with reference to FIG. 1.

The inserts 300, 350 may be formed from a wide variety of suitable materials and/or combinations of materials as desired in various embodiments of the invention. For example, photo sleeve inserts may be formed from a vinyl, polyvinyl, and/or polyvinyl chloride (PVC) material. Other materials and/or construction techniques may be utilized as desired in various embodiments to form a photo sleeve insert. For example, a base layer may be formed of a first material (e.g., cardboard, etc.) and an adhesive film layer may be attached to the base layer along at least one edge. At least one photo may be disposed underneath the adhesive film layer, and the adhesive film layer may be pressed against the base layer to hold the at least one photo in place. In certain embodiments, an adhesive film layer may be attached to either side of a base layer.

A wide variety of different configurations may be utilized to form an insert of a payment device 100 as desired in various embodiments of the invention. For example, one or more inserts may be formed as photo sleeves as discussed above. Other inserts may have graphics, text, and/or illustrations printed or otherwise disposed upon them. For example, various inserts may include portions and/or illustrations for a story. Printed insert sheets may be formed from a wide variety of suitable materials, such as vinyl, polyvinyl, PVC, cardboard, paper, etc. Printing on the insert sheet may be accomplished prior to the sale or distribution of a payment device 100 to a consumer, during the sale or distribution, or following the sale or distribution. For example, insert sheets may be pre-printed. As another example, insert sheets may be printed upon by a printer or other suitable machine that dispenses payment devices or that is otherwise associated with the dispense or distribution of payment device (e.g., a printer at a merchant point of sale). As yet another example, certain insert sheets may be printed upon, written upon, or drawn upon by a consumer. Additionally, as desired in various embodiments of the invention, insert sheets may include any number of layers. For example, a two layer insert may be formed of a vinyl material, and each layer may include printed graphics and/or text. The two layers may then be attached or bonded together to form an insert. The front covers 200, 250 illustrated in FIGS. 2A and 2B are provided by way of example only and should not be construed as limiting.

FIGS. 4A and 4B are front and back views of an example back cover 400 that may be utilized in accordance with various embodiments of the invention. The example back cover 400 illustrated in FIGS. 4A and 4B is an example back cover that may be incorporated into a suitable payment device, such as the payment device 100 illustrated in FIG. 1. With reference to FIGS. 4A and 4B, a front side 405 and back side 410 of a back cover are illustrated. When included in a payment device 100, the front side 405 may face one or more other components of the payment device 100 (e.g., one or more inserts) when the payment device 100 is in a closed position, and the back side 410 may face away from the other components of the payment device 100. However, in other embodiments, the front side 405 and the back side 410 may be reversed.

In certain embodiments, the back cover 400 may be formed as and/or include a suitable transaction card or payment card, such as a gift card or stored value card. In this regard, one or more payment mechanisms, such as a magnetic stripe payment mechanism, a barcode payment mechanism, and/or a contactless payment mechanism may be integrated or incorporated into the back cover 400. As shown in FIG. 4A, a magnetic stripe 415 may be disposed, formed, or integrated into the front side 405 of the back cover 400. During a use of a payment device 100 to facilitate a transaction, the back cover 400 may be at least partially rotated or opened away from other components of the payment device 100 such that information encoded or embedded on the magnetic stripe 415 may be read by a magnetic stripe reader associated with a merchant POS device. When the payment device 100 is not being utilized to facilitate a transaction, the magnetic stripe 415 may face other components of the payment device 100. In this regard, the magnetic stripe 415 may be at least partially protected from scratches, abrasions, etc.

Additionally, as shown in FIG. 4A, a contactless payment mechanism may be incorporated into the back cover 400. For example, a suitable IC chip 420 may be coupled to an appropriate antenna 425 and/or transceiver. During a use of a payment device 100 to facilitate a transaction, the payment device 100 and/or the back cover 400 may be placed in proximity to a contactless reader, such as an RFID transceiver, associated with a merchant POS device. In this regard, account and/or monetary value information stored by the IC chip 420 may be communicated to the POS device by the payment device 100.

In certain embodiments, at least a portion of the back cover 400 may be detachable or removable from a payment device 100. For example, as shown in FIGS. 4A and 4B, a perforation or other detachment mechanism and/or suitable detachment indicia 430 (e.g., a line indicating a perforation, a line on which the back cover 400 should be cut, etc.) may be incorporated into the back cover 400. In this regard, a payment card may be detached or removed from a remainder of a booklet or album payment device as desired in various embodiments of the invention.

The back cover 400 illustrated in FIGS. 4A and 4B may include an attachment area 435 or a seal area that is designated or formed in a horizontal manner. For example, the attachment area 435 may be formed along a horizontal edge of the back cover 400, such as along a top edge of the back cover 400. In this regard, the back cover 400 may be rotated or flipped in a vertical manner. In other embodiments, the attachment area 435 may be formed along a vertical edge of the back cover 400, as illustrated in FIGS. 5A and 5B. As desired, a magnetic stripe and/or a bar code that is integrated into the back cover 400 may be formed in the same direction as the attachment area 435. A hinged attachment of the back cover 400 to other components of the payment device 100 may be formed utilizing a wide variety of different attachment mechanisms and/or techniques, as discussed in greater detail above with reference to FIG. 1.

With reference to FIG. 4B, an example back side 410 of a back cover 400 is illustrated. The back side 410 may include a wide variety of various graphics, text, and/or illustrations as desired in various embodiments of the invention. For example, various graphics and/or text may be printed or otherwise disposed onto the back side 410 of the back cover 400. In certain embodiments, the back side 410 of the back cover 400 may include various information associated with a payment card or transaction card. For example, as illustrated in FIG. 4B, a signature area 440 and/or an area 445 including legal information (e.g., terms and conditions, activation information, etc.) may be printed or otherwise disposed on the back side 410. In certain embodiments, such as gift card embodiments, a scratch off area 450 may also be provided. The scratch off area 450 may include a material that may be scratched off or otherwise removed by a user of the payment device 100 in order to identify information associated with the use of the payment device 100, such as a gift card PIN. As an alternative to printing various information on the back side 410, at least a portion of the information may be printed or otherwise disposed on the front side 405 of the back cover 400 and/or on other components of a payment device 100 as desired in various embodiments of the invention.

The back cover 400 may be formed from a wide variety of suitable materials and/or combinations of materials as desired in various embodiments of the invention. For example, the back cover 400 may be formed of a vinyl, polyvinyl, and/or polyvinyl chloride (PVC) material. In embodiments in which the back cover 400 includes a transaction card, the back cover 400 may be formed from a laminated PVC material having a thickness of approximately 0.028 inches. Other materials and/or construction techniques may be utilized as desired in various embodiments to form a back cover 400. Additionally, as desired, the back cover 400 may be formed from any number of layers of material.

FIGS. 5A and 5B are front and back views of another example back cover 500 that may be utilized in accordance with various embodiments of the invention. The example back cover 500 illustrated in FIGS. 5A and 5B is an example back cover 500 that may be incorporated into a suitable payment device, such as the payment device 100 illustrated in FIG. 1. With reference to FIGS. 5A and 5B, a front side 505 and back side 510 of a back cover are illustrated. When included in a payment device 100, the front side 505 may face one or more other components of the payment device 100 (e.g., one or more inserts) when the payment device 100 is in a closed position, and the back side 510 may face away from the other components of the payment device 100. However, in other embodiments, the front side 505 and the back side 510 may be reversed. The various components of the back cover 500 may be similar to those described above with reference to the back cover 400 illustrated in FIGS. 4A and 4B although different layouts and/or combinations of components may be provided.

With reference to FIG. 5A, the front side 505 may include one or more integrated or incorporated payment mechanisms, such as a magnetic stripe 530 that may be read by a suitable magnetic stripe reader. Any number of suitable payment mechanisms may be incorporated into the back cover 500 as desired in various embodiments of the invention, as described in greater detail above with reference to FIG. 1. Additionally, various graphics, text, and/or illustrations may be printed or otherwise disposed on the front side 505 of the back cover 500. As shown, an area 515 including legal information (e.g., terms and conditions, activation information, etc.) may be printed or otherwise disposed on the front side 505 of the back cover. With respect to the back side 510 of the back cover 500, a wide variety of graphics, text, and/or illustrations, such as various artwork 520 may be printed or otherwise disposed on the back side 510.

The back cover 500 illustrated in FIGS. 5A and 5B may include an attachment area 525 or a seal area that is designated or formed in a vertical manner. For example, the attachment area 525 may be formed along a vertical edge of the back cover 500, such as along a side edge (e.g., a left edge or right edge) of the back cover 500. In this regard, the back cover 500 may be rotated or flipped in a horizontal manner. In other embodiments, the attachment area 525 may be formed along a horizontal edge of the back cover 500, as illustrated in FIGS. 4A and 4B. As desired, a magnetic stripe and/or a bar code that is integrated into the back cover 500 may be formed in the same direction as the attachment area 525. A hinged attachment of the back cover 500 to other components of the payment device 100 may be formed utilizing a wide variety of different attachment mechanisms and/or techniques, as discussed in greater detail above with reference to FIG. 1.

In certain embodiments of the invention, various components of the front covers, back covers, and/or inserts described above may be rearranged. For example, an example back cover as described in FIGS. 4A-5B above may be utilized as a front cover of a payment device, and an example front cover as described in FIGS. 2A-2B may be utilized as a back cover of a payment device. In this regard, a wide variety of different payment devices with various configurations and/or components may be formed or provided.

FIG. 6 is a flowchart of an example method 600 for forming a payment device, according to an illustrative embodiment of the invention. For example, the method 600 may be utilized to form the payment device 100 illustrated in FIG. 1. The method 600 may begin at block 605.

At block 605, a front cover, back cover, and at least one insert or insert sheet may be provided as components of a payment device. For example, the front cover 105, back cover 110, and inserts 115 illustrated in FIG. 1 may be provided. Each of the provided components may be formed from a wide variety of suitable materials, as described above with reference to FIG. 1. Additionally, as desired, each of the components may be pre-printed with various graphics, text, and/or other information. In certain embodiments, one or more of the components may be cut from a die sheet. For example, a die sheet may be provided, and a plurality of front covers may be cut from the die sheet. The plurality of front covers may then be utilized in the formation of a plurality of respective payment devices. One or more other components may be cut from a die sheet or other common source as desired in various embodiments.

At block 610, at least one suitable payment mechanism, such as a magnetic stripe payment mechanism, a barcode payment mechanism, and/or a contactless payment mechanism, may be integrated or incorporated into one or more of the front cover 105, the back cover 110, and the inserts 115. The at least one suitable payment mechanism may facilitate using the payment device 100 at a merchant location in order to complete a transaction. In certain embodiments, a component of the payment device 100, such as the back cover 110, may be formed as a payment mechanism. For example, the back cover 110 may be formed as a transaction card (e.g., gift card, stored value card, etc.).

At block 615, the components of the payment device 100 may be hinged, hingedly attached or sealed together utilizing one or more suitable attachment devices and/or attachment techniques, as described in greater detail above with reference to FIG. 1. For example, the inserts 115 may be disposed or situated between the front cover 105 and the back cover 110 and the front cover 105, the back cover 110, and inserts 115 may be attached together. In certain embodiments, the components of the payment device 100 may be attached together along a common edge, such as a common vertical edge or a common horizontal edge. In this regard, the payment device 100 may be formed as a booklet or album that may be opened and/or flipped through.

At block 620, the at least one payment mechanism may be personalized. A wide variety of different personalization techniques and/or mechanisms may be utilized to personalize the at least one payment mechanism. For example, a magnetic stripe may be encoded with embedded account information and/or various monetary information, such as a value for a gift card or stored value card. As another example, account information and/or monetary information may be programmed into an IC chip of a contactless payment mechanism.

The method 600 may end following block 620.

The operations described and shown in the method 600 of FIG. 6 may be carried out or performed in any suitable order as desired in various embodiments of the invention. For example, the at least one payment mechanism may be personalized prior to the attachment of the various components of the payment device 100. Additionally, in certain embodiments, at least a portion of the operations may be carried out in parallel. Furthermore, in certain embodiments, less than or more than the operations described in FIG. 6 may be performed.

Accordingly, example embodiments of the invention can provide the technical effects of forming a payment device that includes a booklet or album with one or more integrated payment mechanisms. In this regard, a payment device, such as a gift card, may be personalized prior to giving or providing the payment device to a recipient. For example, various messages, images, and/or pictures may be added to the payment device in order to personalize the payment device.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A payment device, comprising:
    a front cover;
    a back cover;
    at least one insert disposed between the front cover and the back cover, wherein the front cover, the back cover, and the at least one insert are hinged together along a respective common edge, wherein the at least one insert comprises a photo sleeve;
    at least one payment mechanism integrated into one of the front cover, the back cover, or the at least one insert, wherein the integrated at least one payment mechanism and a corresponding portion of the front cover, the back cover, or the at least one insert is detachable via at least one perforation adjacent to the common edge;
    a temporary attachment between two or more of the front cover, the back cover, or the at least one insert, wherein the temporary attachment is not along the respective common edge; and
    at least one audio device, integrated into one of the front cover, the back cover, or the at least one insert disposed between the front cover and the back cover, wherein the at least one audio device comprises a speaker, a microphone, and at least one memory for storing an audio message.

2. The payment device of claim 1, wherein the at least one payment mechanism comprises at least one of a magnetic stripe payment mechanism or a contactless payment mechanism.

3. The payment device of claim 1, wherein the at least one payment mechanism is incorporated into the back cover.

4. The payment device of claim 1, wherein the at least one insert comprises a plurality of inserts.

5. The payment device of claim 1, wherein the front cover, the back cover, and the at least one insert are hinged together utilizing one of an adhesive, a radio frequency sealing technique, a hypersonic sealing technique, an ultrasonic sealing technique, or a binding technique.

6. The payment device of claim 1, wherein the front cover, the back cover, and the at least one insert are attached together along a plurality of respective common edges.

7. The payment device of claim 1, wherein at least one of the front cover, the back cover, and the at least one insert is comprised of vinyl or polyvinyl chloride.

8. The payment device of claim 1, wherein the front cover comprises one of an opening or a window.

9. The method of claim 1, wherein providing a front cover comprises providing a front cover that includes one of an opening or a window.

10. A method for forming a payment device, the method comprising:
    providing a front cover, a back cover, and at least one insert, wherein the at least one insert comprises a photo sleeve;
    integrating at least one payment mechanism into one of the front cover, the back cover, or the at least one insert, wherein the integrated at least one payment mechanism and a corresponding portion of the front cover, the back cover, or the at least one insert is detachable via at least one perforation;
    hinging the front cover, the back cover, and the at least one insert together along a respective common edge, wherein the integrated at least one payment mechanism and a corresponding portion of the front cover, the back cover, or the at least one insert is detachable adjacent to the common edge;
    providing a temporary attachment between two or more of the front cover, the back cover, or the at least one insert, wherein the temporary attachment is not along the respective common edge; and
    integrating at least one audio device into one of the front cover, back cover, or the at least one insert, wherein the at least one audio device comprises a speaker, a microphone, and at least one memory for storing an audio message.

11. The method of claim 10, wherein integrating at least one payment mechanism comprises integrating at least one of a magnetic stripe payment mechanism or a contactless payment mechanism.

12. The method of claim 10, wherein integrating at least one payment mechanism comprises integrating at least one payment mechanism into the back cover.

13. The method of claim 10, further comprising:
    personalizing the at least one payment mechanism.

14. The method of claim 10, wherein providing at least one insert comprises providing a plurality of inserts.

15. The method of claim 10, wherein hinging the front cover, the back cover, and the at least one insert comprises hinging the front cover, the back cover, and the at least one insert utilizing one of an adhesive, a radio frequency sealing technique, a hypersonic sealing technique, an ultrasonic sealing technique, or a binding technique.

16. The method of claim 10, wherein hinging the front cover, the back cover, and the at least one insert comprises hinging the front cover, the back cover, and the at least one insert along a plurality of respective common edges.

17. A payment device, comprising:
    a booklet comprising a front cover, a back cover, and one or more inserts disposed between the front cover and the back cover, wherein the one or more inserts comprise a photo sleeve;

at least one payment mechanism integrated into the booklet, the at least one payment mechanism comprising a magnetic stripe payment mechanism, the at least one payment mechanism detachable from the booklet via at least one perforation in at least one cover or insert of the booklet;

a temporary attachment between two or more of the front cover, the back cover, or the one or more inserts; and at least one audio device, integrated into the booklet, wherein the at least one audio device comprises a speaker, a microphone, and at least one memory for storing an audio message.

\* \* \* \* \*